US012695777B2

(12) United States Patent
Ueda et al.

(10) Patent No.: US 12,695,777 B2
(45) Date of Patent: Jul. 28, 2026

(54) DATA PROCESSING DEVICE, DATA PROCESSING METHOD, AND RECORDING MEDIUM

(71) Applicant: NEC Corporation, Tokyo (JP)

(72) Inventors: Hirofumi Ueda, Tokyo (JP); Kazuaki Nakajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 108 days.

(21) Appl. No.: 18/694,006

(22) PCT Filed: Nov. 8, 2021

(86) PCT No.: PCT/JP2021/040915
§ 371 (c)(1),
(2) Date: Mar. 21, 2024

(87) PCT Pub. No.: WO2023/079721
PCT Pub. Date: May 11, 2023

(65) Prior Publication Data
US 2024/0396925 A1     Nov. 28, 2024

(51) Int. Cl.
*H04L 9/40*          (2022.01)

(52) U.S. Cl.
CPC ...... *H04L 63/1433* (2013.01); *H04L 63/1425* (2013.01)

(58) Field of Classification Search
CPC .. H04L 63/1433; H04L 63/1425; G06F 21/57
See application file for complete search history.

(56) References Cited

U.S. PATENT DOCUMENTS

| | | | | |
|---|---|---|---|---|
| 9,467,464 | B2* | 10/2016 | Gula | .................. H04L 63/1433 |
| 12,309,188 | B1* | 5/2025 | Al Ghazo | ........... H04L 63/1425 |

(Continued)

FOREIGN PATENT DOCUMENTS

| | | |
|---|---|---|
| JP | 2006-252109 A | 9/2006 |
| JP | 2020-166650 A | 10/2020 |
| WO | 2021/192587 A1 | 9/2021 |

OTHER PUBLICATIONS

Wikipedia article for "Common Vulnerability Scoring System" dated Aug. 20, 2020 (7 pages) https://en.wikipedia.org/w/index.php?title=Common_Vulnerability_Scoring_System&oldid=975757215 (Year: 2020).*

(Continued)

*Primary Examiner* — Amir Mehrmanesh
*Assistant Examiner* — Thomas A Gyorfi
(74) *Attorney, Agent, or Firm* — Sughrue Mion, PLLC

(57)          ABSTRACT
A setting unit (11) sets a path or a procedure for a cyber attack that is obtained through analysis of a risk to a communication system. A collection unit (12) collects safety information that is associated with safety in terms of information security regarding the constituent apparatuses of a communication system. An evaluation unit (13) evaluates the magnitude of a security risk present in the communication system, in accordance with the path or procedure for the cyber attack, on the basis of the security information, the security risk to a constituent apparatus related to the path or procedure for the cyber attack being evaluated to be lower when inspection for information security has been carried out on the constituent apparatus related to the path or procedure for the cyber attack than when inspection for information security is not carried out.

10 Claims, 11 Drawing Sheets

(56) References Cited

U.S. PATENT DOCUMENTS

2019/0347578 A1\* 11/2019 Bolding .............. H04L 63/1433
2021/0288995 A1\*  9/2021 Attar ....................... H04L 41/22

OTHER PUBLICATIONS

International Search Report for PCT Application No. PCT/JP2021/
040915, mailed on Jan. 25, 2022.
English translation of Written opinion for PCT Application No.
PCT/JP2021/040915, mailed on Jan. 25, 2022.

\* cited by examiner

10(20)

START

SET ATTACK PATH FOR CYBER ATTACK OBTAINED THROUGH ANALYSIS OF RISK TO COMMUNICATION SYSTEM — S101

OBTAIN SAFETY INFORMATION REGARDING CONSTITUENT APPARATUS OF COMMUNICATION SYSTEM — S102

EVALUATE MAGNITUDE OF SECURITY RISK PRESENT IN COMMUNICATION SYSTEM IN ACCORDANCE WITH ATTACK PATH — S103

END

Fig.5

THREAT LEVEL x VULNERABILITY LEVEL

| | ASSET IMPORTANCE LEVEL | | |
|---|---|---|---|
| 9 | RISK VALUE C | RISK VALUE B | RISK VALUE A |
| 6 | RISK VALUE D | | |
| 4 | | RISK VALUE C | RISK VALUE B |
| 3 | | | |
| 2 | RISK VALUE E | RISK VALUE D | RISK VALUE C |
| 1 | | | |
| | 1 | 2 | 3 |

Fig.8

| ATTACK SCENARIO/STEP | THREAT LEVEL | VULNERABILITY LEVEL | BUSINESS DAMAGE LEVEL | RISK VALUE |
|---|---|---|---|---|
| SUPPLY STOPS IN WIDE AREA DUE TO EXECUTION OF WIDE-AREA SUPPLY STOP OPERATION | | | | |
| [N] INTRUSION PORT = SUPERVISORY TERMINAL MALICIOUS THIRD PERSON FRAUDULENTLY ACCESSES OA TERMINAL | | | | |
| MALICIOUS THIRD PERSON FRAUDULENTLY ACCESSES MAINTENANCE SERVER FROM OA TERMINAL | | | | |
| MALICIOUS THIRD PERSON FRAUDULENTLY ACCESSES SUPERVISORY CONTROL SERVER FROM MAINTENANCE SERVER | | | | |
| MALICIOUS THIRD PERSON FRAUDULENTLY ACCESSES HMI FROM SUPERVISORY CONTROL SERVER | 1 | 2 | 2 | C |

Fig.9

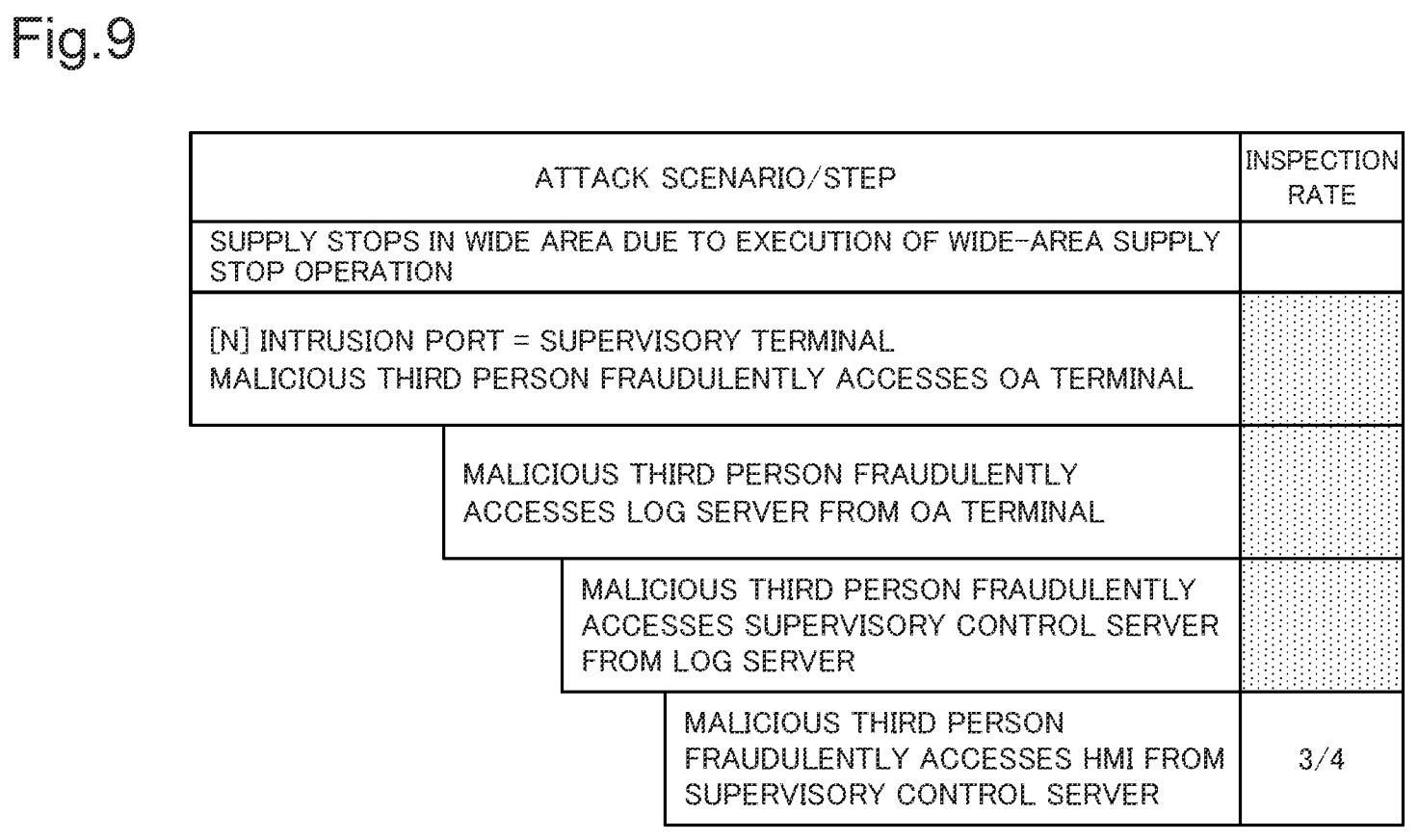

| ATTACK SCENARIO/STEP | INSPECTION RATE |
|---|---|
| SUPPLY STOPS IN WIDE AREA DUE TO EXECUTION OF WIDE-AREA SUPPLY STOP OPERATION | |
| [N] INTRUSION PORT = SUPERVISORY TERMINAL MALICIOUS THIRD PERSON FRAUDULENTLY ACCESSES OA TERMINAL | |
| MALICIOUS THIRD PERSON FRAUDULENTLY ACCESSES LOG SERVER FROM OA TERMINAL | |
| MALICIOUS THIRD PERSON FRAUDULENTLY ACCESSES SUPERVISORY CONTROL SERVER FROM LOG SERVER | |
| MALICIOUS THIRD PERSON FRAUDULENTLY ACCESSES HMI FROM SUPERVISORY CONTROL SERVER | 3/4 |

Fig.10

| ATTACK SCENARIO/STEP | THREAT LEVEL | VULNERABILITY LEVEL | BUSINESS DAMAGE LEVEL | RISK VALUE | INSPECTION RATE |
|---|---|---|---|---|---|
| SUPPLY STOPS IN WIDE AREA DUE TO EXECUTION OF WIDE-AREA SUPPLY STOP OPERATION | | | | | |
| [N] INTRUSION PORT = SUPERVISORY TERMINAL MALICIOUS THIRD PERSON FRAUDULENTLY ACCESSES OA TERMINAL | | | | | |
| MALICIOUS THIRD PERSON FRAUDULENTLY ACCESSES LOG SERVER FROM OA TERMINAL | | | | | |
| MALICIOUS THIRD PERSON FRAUDULENTLY ACCESSES SUPERVISORY CONTROL SERVER FROM LOG SERVER | | | | | |
| MALICIOUS THIRD PERSON FRAUDULENTLY ACCESSES HMI FROM SUPERVISORY CONTROL SERVER | 1 | 2 | 2 | C | 3/4 |

DATA PROCESSING DEVICE, DATA PROCESSING METHOD, AND RECORDING MEDIUM

This application is a National Stage Entry of PCT/JP2021/040915 filed on Nov. 8, 2021, the contents of all of which are incorporated herein by reference, in their entirety.

TECHNICAL FIELD

The present invention relates to a data processing device, a data processing method, and a recording medium, and more particularly relates to a data processing device, a data processing method, and a recording medium related to an information communication apparatus included in a communication system.

BACKGROUND ART

There has been provided a communication system that enables remote control of industrial equipment by a control system by connecting devices such as a sensor, a camera, an Internet of things (IoT) device, a communication terminal, and the like in a factory, and industrial equipment such as manufacturing equipment, transportation equipment, and the like to the control system via a communication network. For example, the communication system is an operational technology (OT) control system or an information communication technology (ICT) system. In recent years, there is a higher possibility (threat) that those communication systems are subject to a cyber attack from the outside or the inside.

For example, the cyber attack is executed aiming at a security hole generated due to a defect of a program or a design mistake. Alternatively, the cyber attack may be executed using a backdoor invisible to a user. According to a related security risk analysis technique, magnitude of a potential security risk in the communication system is evaluated based on, in addition to an importance level of business (asset value, non-operating time cost, etc.), a threat level indicating a likelihood of occurrence of a threat and a vulnerability level indicating a likelihood of acceptance of the threat that has occurred (e.g., Patent Literature 1).

CITATION LIST

Patent Literature

PTL 1: JP 2020-166650 A

SUMMARY OF INVENTION

Technical Problem

The related security risk analysis technique does not consider whether appropriate inspection for information security for finding a security hole is performed on constituent apparatuses included in the communication system. Therefore, it fails to appropriately estimate the threat, and validity of the security risk evaluation is unclear.

The present invention has been conceived in view of the problem described above, and an object of the present invention is to appropriately evaluate a potential security risk in a communication system.

Solution to Problem

A data processing device according to an aspect of the present invention includes a setting means that sets a path or a procedure for a cyber attack obtained through analysis of a risk to a communication system, a collection means that collects safety information associated with safety in terms of information security regarding a constituent apparatus of the communication system, the safety information including information indicating whether an inspection for the information security is performed on the constituent apparatus, and an evaluation means that evaluates, based on the safety information, magnitude of a security risk present in the communication system in accordance with the path or the procedure, in which, in a case where the inspection for the information security is performed on the constituent apparatus related to the path or the procedure, the evaluation means evaluates the security risk to be lower than the security risk in a case where the inspection for the information security is not performed on the constituent apparatus related to the path or the procedure.

A data processing method according to an aspect of the present invention includes setting a path or a procedure for a cyber-attack obtained through analysis of a risk to a communication system, collecting safety information associated with safety in terms of information security regarding a constituent apparatus of the communication system, the safety information including information indicating whether an inspection for the information security is performed on the constituent apparatus, evaluating, based on the safety information, magnitude of a security risk present in the communication system in accordance with the path or the procedure, and in a case where the inspection for the information security is performed on the constituent apparatus related to the path or the procedure, evaluating the security risk to be lower than the security risk in a case where the inspection for the information security is not performed on the constituent apparatus related to the path or the procedure.

A recording medium according to an aspect of the present invention stores a program for causing a computer to set a path or a procedure for a cyber attack obtained through analysis of a risk to a communication system, collect safety information associated with safety in terms of information security regarding a constituent apparatus of the communication system, the safety information including information indicating whether an inspection for the information security is performed on the constituent apparatus, evaluate, based on the safety information, magnitude of a security risk present in the communication system in accordance with the path or the procedure, and in a case where the inspection for the information security is performed on the constituent apparatus related to the path or the procedure, evaluate the security risk to be lower than the security risk in a case where the inspection for the information security is not performed on the constituent apparatus related to the path or the procedure, in which, in the case where the inspection for the information security is performed on the constituent apparatus related to the path or the procedure, the security risk is evaluated to be lower than the security risk in the case where the inspection for the information security is not performed on the constituent apparatus related to the path or the procedure.

Advantageous Effects of Invention

According to an aspect of the present invention, it becomes possible to appropriately evaluate a potential security risk in a communication system.

BRIEF DESCRIPTION OF DRAWINGS

FIG. 5 is a diagram illustrating a risk value that is an exemplary evaluation index of magnitude of a security risk related to the communication system.

FIG. 8 is a diagram illustrating an exemplary attack scenario displayed by a display unit according to the third example embodiment, and exemplary evaluation of a security risk related to the attack scenario.

FIG. 9 is a diagram illustrating an exemplary attack scenario displayed by the display unit according to the third example embodiment, and exemplary evaluation of a security risk related to the attack scenario.

FIG. 10 is a diagram illustrating an exemplary attack scenario displayed by the display unit according to the third example embodiment, and exemplary evaluation of a security risk related to the attack scenario.

EXAMPLE EMBODIMENT

Some example embodiments of the present invention will be described below with reference to the accompanying drawings.

(Communication System 1)

Figure 1:
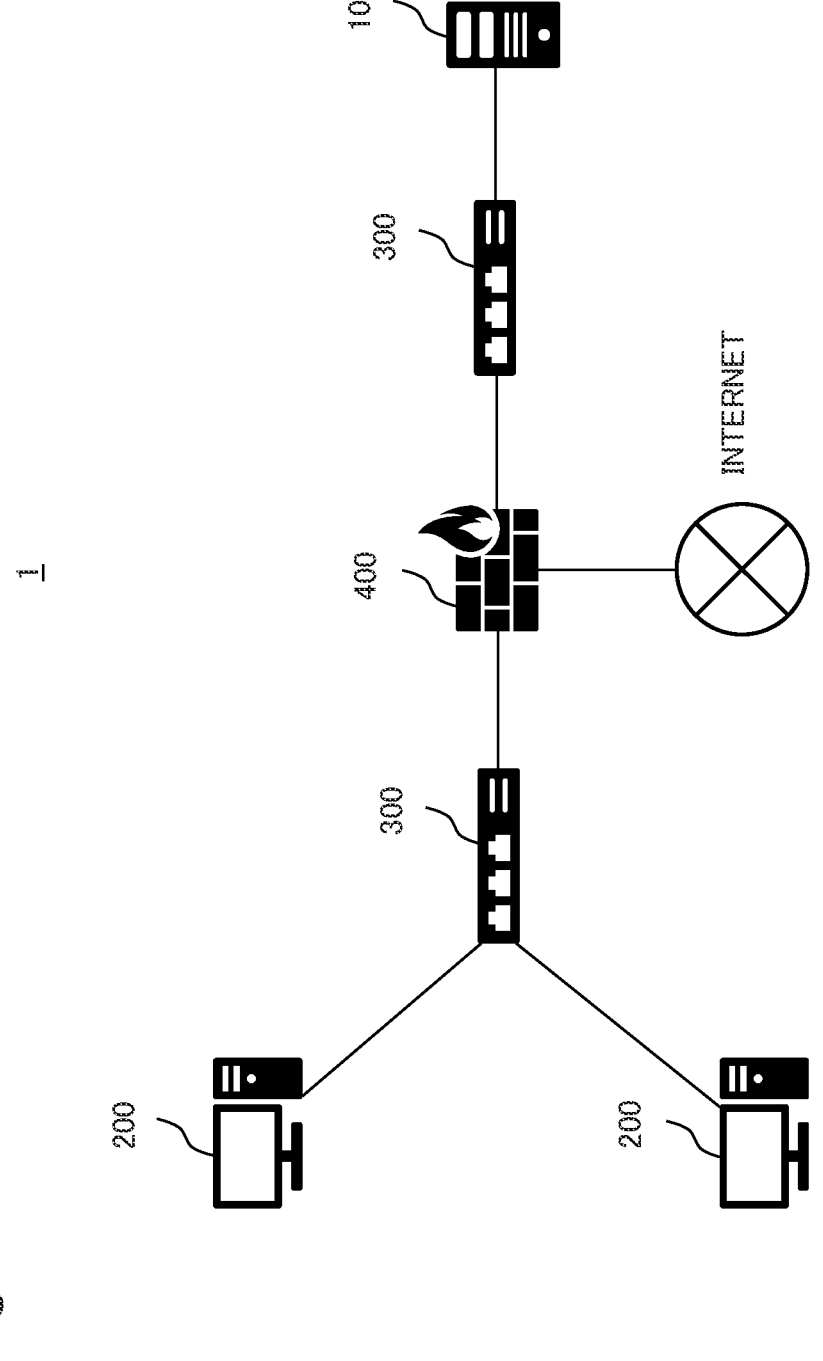
FIG. 1 is a diagram schematically illustrating an example of a communication system that is an entity of a virtual model generated by a data processing device according to first to third example embodiments.

An exemplary configuration of a communication system 1 will be described with reference to FIG. 1. FIG. 1 is a diagram schematically illustrating an exemplary configuration of the communication system 1. For example, the communication system 1 is any one of an Internet of things (IoT) system, an information and communication technology (ICT) system, a local area network (LAN), an infrastructure system, and an industrial control system (ICS). However, the communication system 1 may be other than those examples.

The communication system 1 is an entity of a virtual model generated by a data processing devices 10, 20, and 30 according to first to third example embodiments to be described later. That is, the data processing devices 10, 20, and 30 execute data processing for generating the virtual model of the communication system 1.

As illustrated in FIG. 1, the communication system 1 includes, in addition to a control server 100 and a client terminal 200 (hereinafter, these will be referred to as nodes 100 and 200), a switch 300 and a firewall 400. The communication system 1 constructs a communication network such as a local area network (LAN), a wide area network (WAN), or the like. In FIG. 1, lines connecting the constituent apparatuses (nodes 100 and 200, switch 300, and firewall 400) of the communication system 1 indicate that the constituent apparatuses are mutually communicable.

The nodes 100 and 200 are hardware devices or software having a communication function and an information processing function (arithmetic function). For example, the nodes 100 and 200 are personal computers, human machine interfaces (HMIs), control servers, log servers, programmable logic controllers (PLCs), application programming interfaces (APIs), Internet of things (IoT) devices, or mobile devices. Here, it is assumed that the node 100 is a client terminal (e.g., personal computer) and the node 200 is a control server.

The switch 300 is a network device that implements a routing function by hardware processing, and is, for example, Ethernet. As illustrated in FIG. 1, the switch 300 has a role of transferring communication between the constituent apparatuses of the communication system 1.

The firewall 400 is provided between the constituent apparatuses of the communication system 1 and between the communication system 1 and an external network (the Internet in FIG. 1), and restricts data communication or communication connection for computer security reasons and the like. The firewall 400 may be mounted on a router, or may be implemented as application software (what is called application firewall).

The configuration of the communication system 1 illustrated in FIG. 1 is merely an example. For example, the communication system 1 may further include industrial equipment to be controlled by the PLC. Each of the nodes 100 and 200 may be one, or may be any number of two or more.

In the following descriptions, the "node 100 (200)" indicates at least one of the node 100 or the node 200.

First Example Embodiment

A first example embodiment will be described with reference to FIGS. 2 and 3.

(Data Processing Device 10)

A configuration of a data processing device 10 according to the present first example embodiment will be described with reference to FIG. 2. FIG. 2 is a block diagram illustrating a configuration of the data processing device 10.

Figure 2:
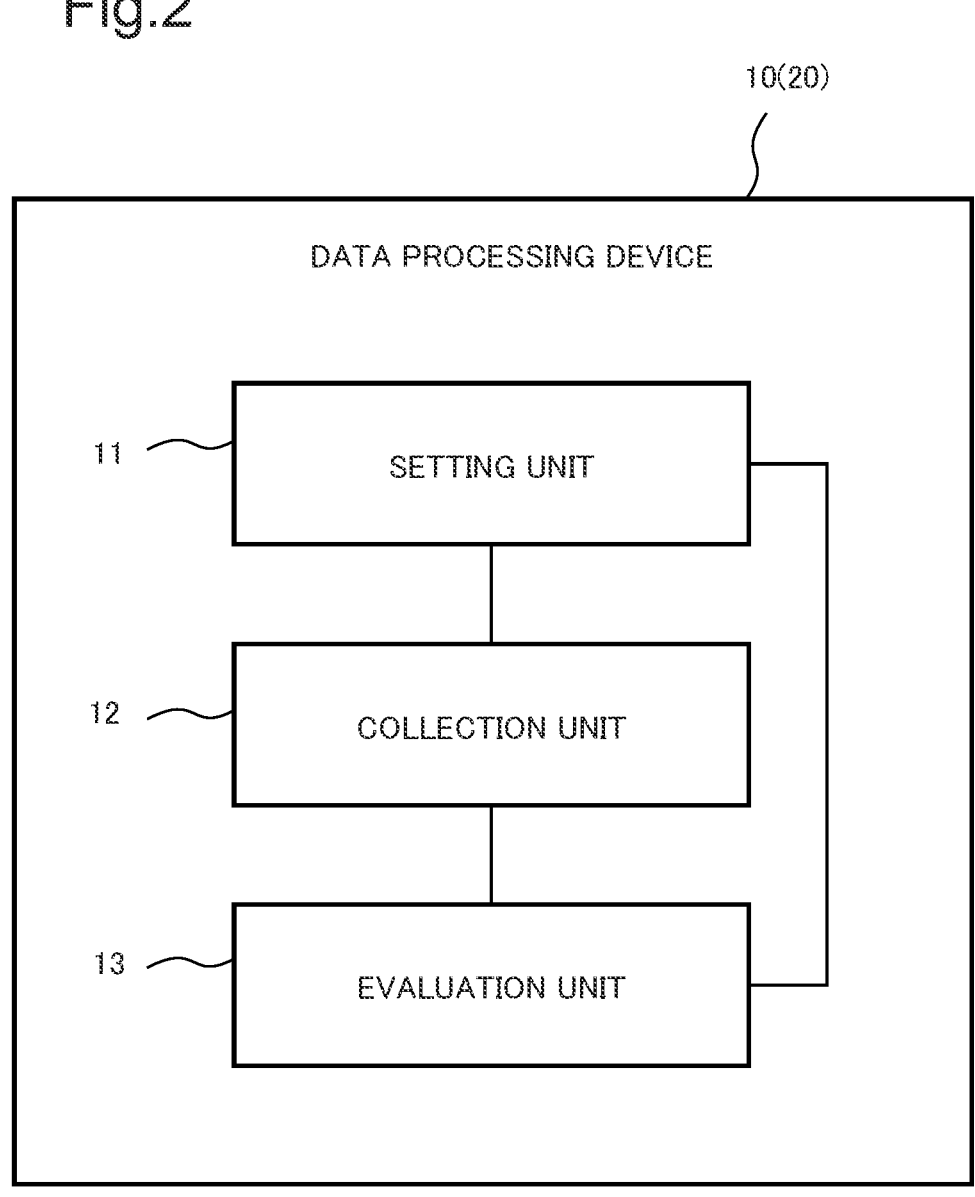
FIG. 2 is a block diagram illustrating a configuration of the data processing device according to the first and second example embodiments.

As illustrated in FIG. 2, the data processing device 10 includes a setting unit 11, a collection unit 12, and an evaluation unit 13.

The setting unit 11 sets a path or a procedure for a cyber attack obtained through analysis of a risk to a communication system 1 (FIG. 1). The setting unit 11 is an exemplary setting means. Hereinafter, the path of the cyber attack will be referred to as an "attack path", and the procedure for the cyber attack will be referred to as an "attack scenario".

For example, the setting unit 11 receives an operation of inputting information indicating contents of the attack path or the attack scenario of the cyber attack obtained through the analysis of risk to the communication system 1, the operation being performed on an input device (not illustrated). For example, the information indicating the contents of the attack path or the attack scenario of the cyber attack includes information specifying an intrusion port and a target of the attack path. The information indicating the contents of the attack path or the attack scenario of the cyber attack further includes information indicating a step (procedure) and a means (attack method) of the attack scenario.

The setting unit 11 outputs information indicating the attack path or the attack scenario of the cyber attack to the evaluation unit 13. The setting unit 11 further notifies the collection unit 12 of the fact that the attack path or the attack scenario of the cyber attack has been set.

The collection unit 12 collects safety information associated with safety in terms of information security regarding the constituent apparatuses (nodes 100 and 200, switch 300, and firewall 400 in FIG. 1) of the communication system 1 (FIG. 1). The collection unit 12 is an exemplary collection means.

The constituent apparatuses include hardware and software components, and modules included in them. The safety information includes information indicating whether an inspection for information security is performed on the constituent apparatus. The safety information includes a result of the inspection for information security (e.g., source code inspection and backdoor inspection) performed on the constituent apparatus. The safety information further includes information specifying a product or a manufacturer of the constituent apparatus (e.g., product name or manufacturer name).

For example, after receiving the notification that the attack path or the attack scenario of the cyber attack has been set from the setting unit 11, the collection unit 12 obtains information regarding the constituent apparatuses of the communication system 1 from a first database (not illustrated) storing the information regarding the constituent apparatuses of the communication system 1 (e.g., product identifier, manufacturer name, presence or absence of the result of the inspection for information security, etc.).

Next, the collection unit 12 collects the safety information associated with the safety in terms of information security regarding the constituent apparatuses of the communication system 1 from a second database (not illustrated) storing software analysis information. Examples of the software analysis include source code analysis, binary code analysis, open source software (OSS) analysis, a coding check, port scanning, and software installation scanning.

For example, the safety information associated with the safety in terms of information security regarding the constituent apparatuses of the communication system 1 includes the inspection result of the inspection for information security performed on the constituent apparatuses of the communication system 1.

Alternatively, the collection unit 12 may obtain the inspection result of the inspection for information security performed on the constituent apparatuses of the communication system 1 from a software analysis device (not illustrated). The data processing device 10 may include, as a part thereof, a software analysis unit that carries out analysis of the constituent apparatuses.

Alternatively, the safety information associated with the safety in terms of information security regarding the constituent apparatuses of the communication system 1 may include the result of the backdoor inspection.

The collection unit 12 outputs, to the evaluation unit 13, the safety information associated with the safety in terms of information security regarding the constituent apparatuses of the communication system 1.

The evaluation unit 13 evaluates, based on the safety information, magnitude of a security risk present in the communication system 1 in accordance with the attack path or the attack scenario.

At this time, in a case where the inspection for information security is performed on the constituent apparatus related to the attack path or the attack scenario, the evaluation unit 13 evaluates the security risk to be lower than that in a case where the inspection for information security is not performed on the constituent apparatus related to the attack path or the attack scenario. The evaluation unit 13 is an exemplary evaluation means.

For example, the evaluation unit 13 receives, from the collection unit 12, the safety information associated with the safety in terms of information security regarding the constituent apparatuses of the communication system 1. For example, the evaluation unit 13 evaluates the security risk by an information-technology promotion agency (IPA) method. According to the IPA method, the magnitude of the security risk depends on a threat level (likelihood of occurrence of an attack), a vulnerability level (likelihood of acceptance of a threat that has occurred), and an importance level of an asset (e.g., economic value of the asset). Information indicating the threat level, the vulnerability level, and the importance level of the asset is included in the safety information.

The evaluation unit 13 may calculate a first evaluation index indicating the magnitude of the security risk based on the threat level indicating the likelihood of occurrence of a threat and the vulnerability level indicating the likelihood that the generated threat is accepted by the communication system 1.

Alternatively, the evaluation unit 13 may calculate a second evaluation index (third example embodiment) indicating the magnitude of the security risk based on a ratio of the number of constituent apparatuses on the attack path on which the inspection for information security has been performed to the total number of constituent apparatuses on the attack path.

The first evaluation index is based on the threat level, the vulnerability level, and a business damage level ("risk value" in FIG. 8). In the present example, the threat level, the vulnerability level, and the business damage level are included in the safety information.

The second evaluation index is based on the ratio of the number of constituent apparatuses on the attack path on which the inspection for information security has been performed to the number of constituent apparatuses on the attack path ("inspection rate" in FIG. 9). In the present example, information indicating the number of constituent apparatuses on which the inspection for information security has been performed is included in the safety information.

The evaluation unit 13 calculates one or both of the first evaluation index and the second evaluation index. Here, it is assumed that the evaluation unit 13 calculates the first evaluation index, which is the "risk value" (FIG. 5), as an index representing the magnitude of the security risk.

For example, the evaluation unit 13 adds up values of the threat level, the vulnerability level, and the business damage level. Then, the evaluation unit 13 determines which group (e.g., five stages from A to E) of the risk values the obtained sum corresponds to. A correspondence relationship between the sum of the threat level, the vulnerability level, and the business damage level and a group of the risk values is defined in advance, and the evaluation unit 13 may calculate the first evaluation index from the sum of the threat level, the vulnerability level, and the business damage level with reference to a table or the like indicating the correspondence relationship.

Alternatively, the evaluation unit 13 may change the evaluation result depending on a type of the inspection for information security performed on the communication system 1. For example, in a case where the source code inspection is performed on the constituent apparatus of the communication system 1, the evaluation unit 13 evaluates the magnitude of the security risk to be lower than that in a case where another inspection for information security is performed on the constituent apparatus.

Alternatively, the evaluation unit 13 may change the evaluation result depending on origin of the constituent apparatus on which the inspection for information security has been performed. The origin of the constituent apparatus indicates identity, a property, a characteristic, a feature, or composition essentially provided in the constituent apparatus. The origin of the constituent apparatus includes specification, a version, a product name, a manufacturer, a distributor, and a country of manufacture of the constituent apparatus. For example, in a case where the constituent apparatus of the communication system 1 is manufactured by a reliable manufacturer, the evaluation unit 13 evaluates the magnitude of the security risk to be lower than that in a case where the constituent apparatus is manufactured by another manufacturer.

As a variation, the evaluation unit 13 may give a weight to the risk value based on a predetermined condition. A parameter of the weight is not limited.

For example, the evaluation unit 13 may give a weight according to the type of the inspection for information security to the risk value. Alternatively, the evaluation unit 13 may give a weight according to the origin of the constituent apparatus on which the inspection for information security has been performed to the risk value.

The evaluation unit 13 may output information indicating the index (e.g., risk value or inspection rate) representing the magnitude of the security risk to an external device (not illustrated) or a display unit 34 (FIG. 6) as a part of the result of the evaluation regarding the magnitude of the security risk (third example embodiment).

The evaluation unit 13 may save, in a third database (not illustrated), the evaluation result and the safety information in association with each other.

(Operation of Data Processing Device 10)

Operation of the data processing device 10 according to the present first example embodiment will be described with reference to FIG. 3. FIG. 3 is a flowchart illustrating a flow of a process to be executed by the units of the data processing device 10.

Figure 3:
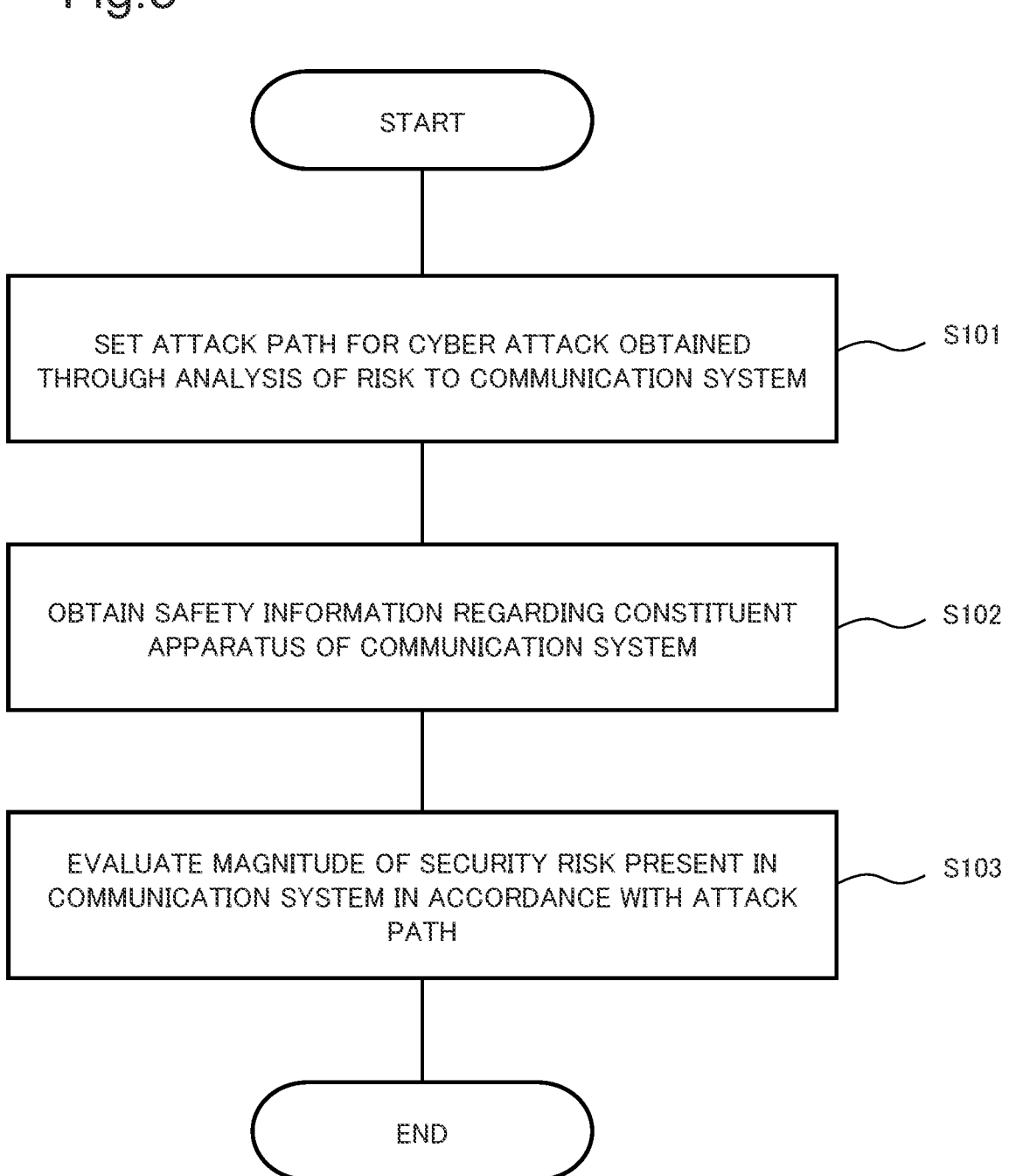
FIG. 3 is a flowchart illustrating an operation of the data processing device according to the first and second example embodiments.

As illustrated in FIG. 3, first, the setting unit 11 sets the path or procedure for the cyber attack obtained through the analysis of the risk to the communication system 1 (FIG. 1) (S101). The setting unit 11 outputs information indicating the attack path or the attack scenario of the cyber attack to the evaluation unit 13.

Next, the collection unit 12 collects the safety information associated with the safety in terms of information security regarding the constituent apparatuses of the communication system 1 (S102). The collection unit 12 outputs, to the evaluation unit 13, the safety information associated with the safety in terms of information security regarding the constituent apparatuses of the communication system 1.

The evaluation unit 13 receives the information indicating the attack path or the attack scenario of the cyber attack from the setting unit 11. The evaluation unit 13 further receives, from the collection unit 12, the safety information associated with the safety in terms of information security regarding the constituent apparatuses of the communication system 1.

Thereafter, the evaluation unit 13 evaluates, based on the safety information, the magnitude of the security risk present in the communication system 1 in accordance with the attack path or the attack scenario. At this time, in a case where the inspection for information security is performed on the constituent apparatus related to the attack path or the attack scenario, the evaluation unit 13 evaluates the security risk to be lower than that in a case where the inspection for information security is not performed on the constituent apparatus related to the attack path (S103).

The evaluation unit 13 may save, in the third database (not illustrated), the result of the evaluation regarding the magnitude of the security risk in association with the safety information.

The operation of the data processing device 10 according to the present first example embodiment is terminated as described above.

Effects of Present Example Embodiment

According to the configuration of the present example embodiment, the setting unit 11 sets the path or procedure for the cyber attack obtained through the analysis of the risk to the communication system 1. The collection unit 12 collects the safety information associated with the safety in terms of information security regarding the constituent apparatuses of the communication system 1. The evaluation unit 13 evaluates, based on the safety information, the magnitude of the security risk present in the communication system 1 in accordance with the path or procedure for the cyber attack, and in a case where the inspection for information security is performed on the constituent apparatus related to the path or procedure for the cyber attack, evaluates the security risk to be lower than that in a case where the inspection for information security is not performed on the constituent apparatus related to the path or procedure for the cyber attack.

The inspection for information security is performed on the constituent apparatuses of the communication system 1, whereby the threat is considered to be smaller than that in a case where no inspection for information security is performed. Therefore, the security risk related to the communication system 1 is also evaluated to be lower. The data processing device 10 determines the magnitude of the security risk in consideration of whether the inspection for information security is performed on the constituent apparatus related to the path or procedure for the cyber attack. As a result, it becomes possible to appropriately evaluate the potential security risk in the communication system 1.

Second Example Embodiment

A second example embodiment will be described with reference to FIG. 4. In the present second example embodiment, an exemplary attack path of a cyber attack obtained through analysis of a risk to a communication system 1 will be described. In the present second example embodiment, an exemplary index representing magnitude of a security risk will be described. The index representing the magnitude of the security risk is obtained from a result of evaluation by an evaluation unit 13.

A configuration and operation of a data processing device 20 according to the present second example embodiment are the same as the configuration and operation of the data processing device 10 (FIG. 2) according to the first example embodiment described above. In the present second example embodiment, the descriptions of the first example embodiment described above will be referred to, and descriptions of the configuration and operation of the data processing device 20 will be omitted.

(Network Configuration Diagram: Exemplary Attack Path)

Figure 4:
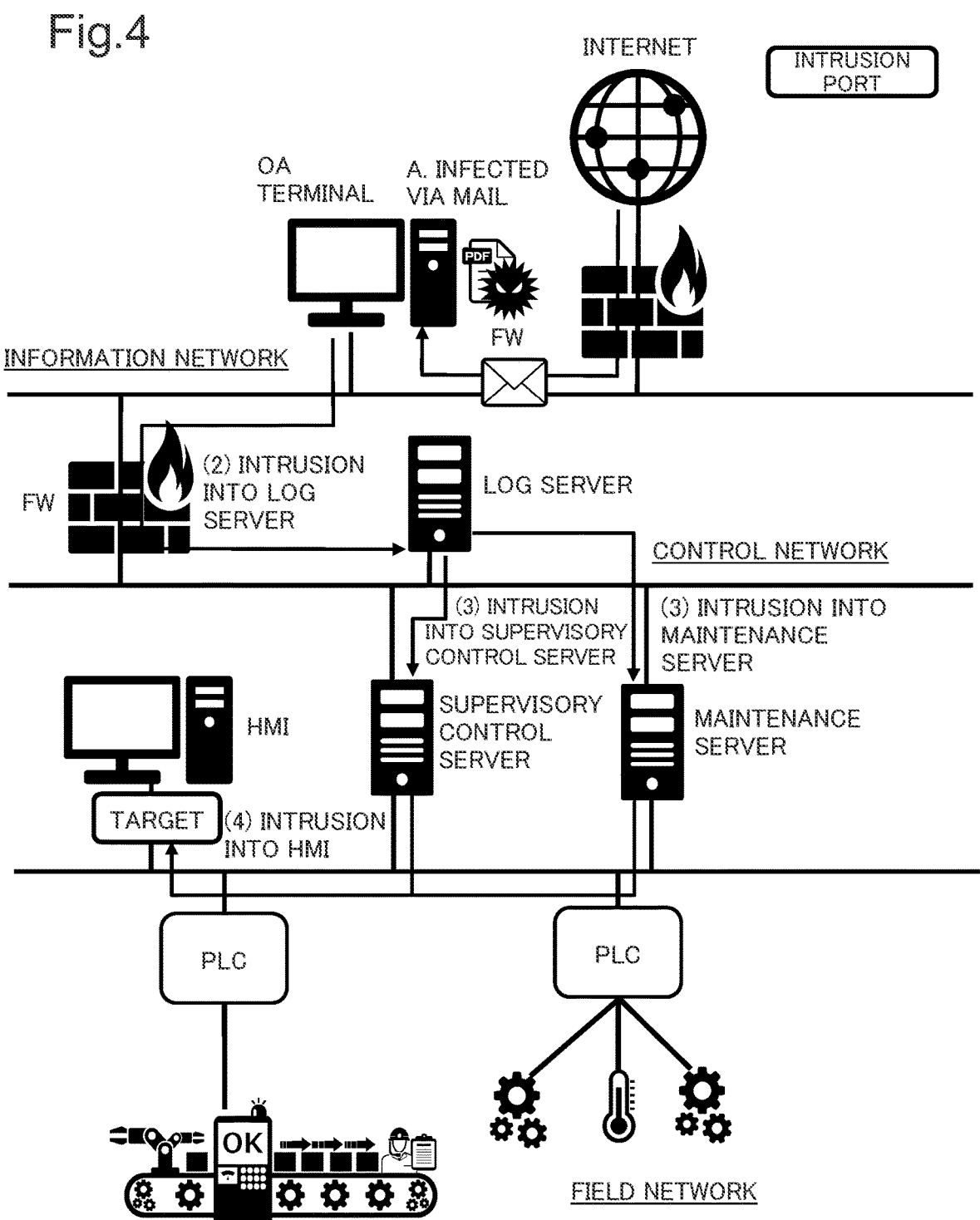
FIG. 4 is a diagram illustrating an exemplary network configuration of a communication system, and is a diagram illustrating an exemplary attack path in a cyber attack.

FIG. 4 is a diagram illustrating an exemplary network configuration of the communication system 1, and is a diagram illustrating an exemplary attack path for the communication system 1 set by a setting unit 11 of the data processing device 20.

The network configuration diagram of the communication system 1 is for displaying network topology. The network configuration diagram of the communication system 1 indicates what kind of connection or relationship constituent apparatuses (e.g., office automation (OA) terminal and log server) of the communication system 1 have. However, the constituent apparatuses illustrated in the network configuration diagram illustrated in FIG. 4 do not correspond to the constituent apparatuses of the communication system 1 illustrated in FIG. 1.

As illustrated in FIG. 4, the attack path includes an intrusion port and a target of the cyber attack. The attack path further includes one or a plurality of constituent apparatuses to be targeted by the cyber attack.

(Security Risk Magnitude Index)

An example of the index representing the magnitude of the security risk present in the communication system 1 will be described with reference to FIG. 5. The index representing the magnitude of the security risk is obtained by the evaluation unit 13 of the data processing device 20. As illustrated in FIG. 5, for example, the index ("risk value") representing the magnitude of the security risk is determined based on a threat level, a vulnerability level, and an importance level of an asset.

The threat level indicates a likelihood of occurrence of a cyber attack on the communication system 1. The vulnerability level indicates a likelihood that the generated threat is accepted by the communication system 1. The importance level of the asset is based on an economic value or the like of the asset included in the communication system 1.

In the example illustrated in FIG. 5, the risk value has five stages of levels A to E. A is associated to the highest security risk, and E is associated to the lowest security risk. The risk value is determined based on a first coordinate in the vertical axis direction obtained by a product of the threat level and the vulnerability level and a second coordinate in the horizontal axis direction obtained by the importance level of the asset. For example, the risk value is "A" (i.e., maximum security risk) when the first coordinate is 9 and the second coordinate is 3. On the other hand, for example, the risk value is "E" (i.e., minimum security risk) when the first coordinate is 1 and the second coordinate is 1.

Effects of Present Example Embodiment

According to the configuration of the present example embodiment, the setting unit 11 sets the path or procedure for the cyber attack obtained through the analysis of the risk to the communication system 1. The collection unit 12 collects the safety information associated with the safety in terms of information security regarding the constituent apparatuses of the communication system 1. The evaluation unit 13 evaluates, based on the safety information, the magnitude of the security risk present in the communication system 1 in accordance with the path or procedure for the cyber attack, and in a case where the inspection for information security is performed on the constituent apparatus related to the path or procedure for the cyber attack, evaluates the security risk to be lower than that in a case where the inspection for information security is not performed on the constituent apparatus related to the path or procedure for the cyber attack.

With the inspection for information security being performed on the constituent apparatus of the communication system 1, the threat is considered to be smaller than that in the case where the inspection for information security is not performed, and thus the security risk related to the communication system 1 is also evaluated to be lower. The data processing device 10 determines the magnitude of the security risk in consideration of whether the inspection for information security is performed on the constituent apparatus related to the path or procedure for the cyber attack. As a result, it becomes possible to appropriately evaluate the potential security risk in the communication system 1.

Third Example Embodiment

A third example embodiment will be described with reference to FIGS. 6 to 10. In the present third example embodiment, a configuration of displaying a result of evaluation regarding magnitude of a security risk together with information indicating an attack scenario will be described.

In the present third example embodiment, the components same as those described in the first and second example embodiments described above will be denoted by the same reference numerals, and descriptions thereof will be omitted.

(Data Processing Device 30)

Figure 6:
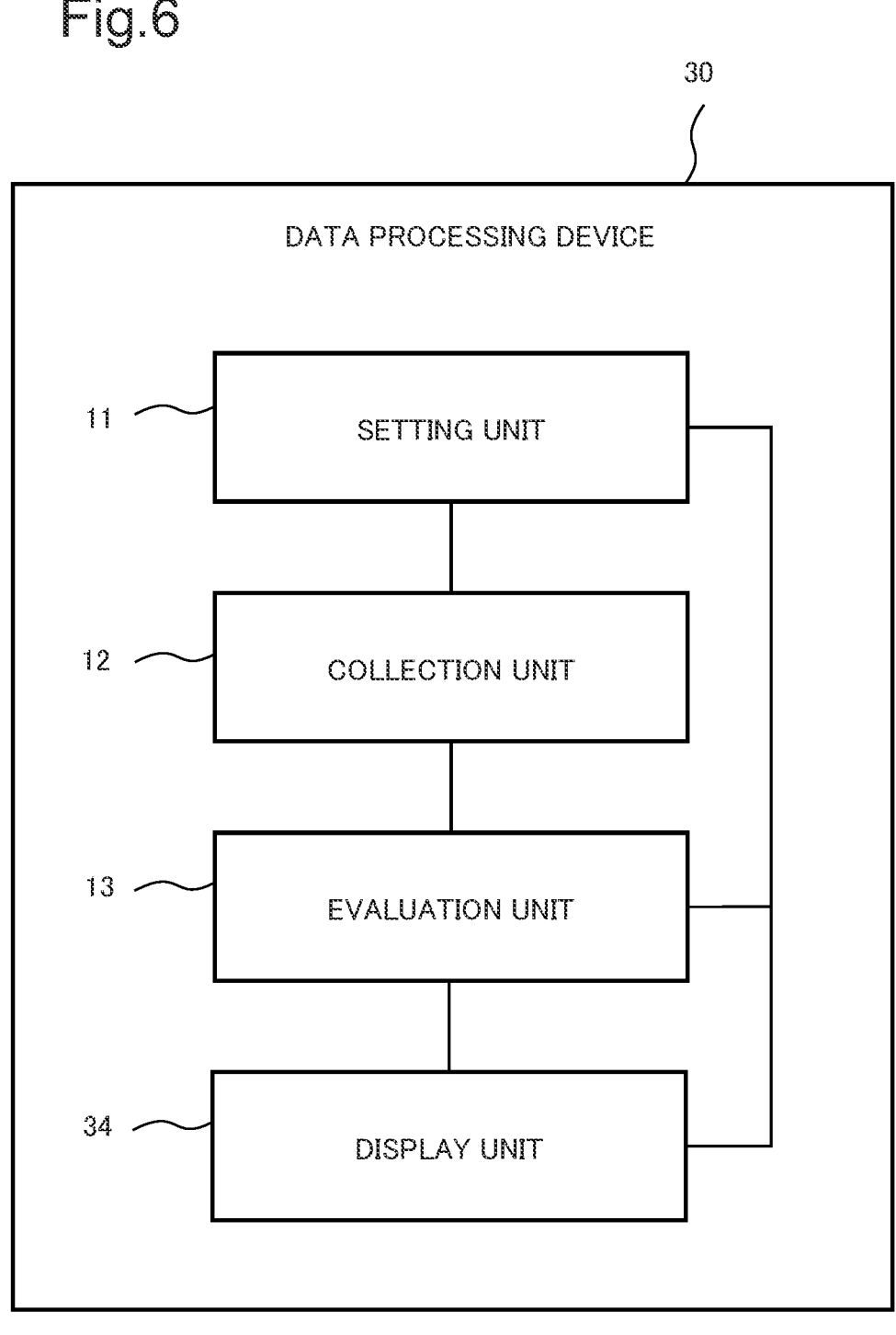
FIG. 6 is a block diagram illustrating a configuration of an information communication apparatus according to the third example embodiment.

A configuration of a data processing device 30 according to the present third example embodiment will be described with reference to FIG. 6. FIG. 6 is a block diagram illustrating a configuration of the data processing device 30.

As illustrated in FIG. 6, the data processing device 30 includes a setting unit 11, a collection unit 12, and an evaluation unit 13. The data processing device 30 further includes a display unit 34.

The display unit 34 causes a display device (not illustrated), such as a display, to display an evaluation result indicating magnitude of a security risk together with information indicating a procedure of an attack assumed in a cyber attack. The display unit 34 is an exemplary display means.

For example, the display unit 34 receives information indicating an attack path or an attack scenario of the cyber attack from the setting unit 11. The display unit 34 further receives, from the evaluation unit 13, information indicating a "risk value" (FIG. 5), which is an exemplary index representing magnitude of a security risk of a communication system 1. The information indicating the risk value includes not only information indicating the risk value itself (e.g., any one of A to E) but also information indicating the threat level, the vulnerability level, and the business damage level described in the first example embodiment described above.

As described in the first example embodiment described above, the threat level indicates a likelihood of occurrence of a threat. The vulnerability level indicates a likelihood that the generated threat is accepted by the communication system 1. The business damage level indicates an economic value of an asset (here, communication system 1) that may be damaged.

The evaluation unit 13 outputs, to the display unit 34, information indicating the index representing the magnitude of the security risk as a part of the result of the evaluation regarding the magnitude of the security risk.

The display unit 34 receives, from the evaluation unit 13, the result of the evaluation regarding the magnitude of the security risk. Then, the display unit 34 causes the display device to display the index representing the magnitude of the security risk included in the result of the evaluation regarding the magnitude of the security risk.

The display unit 34 generates image data for causing the display device to display the attack scenario and the index based on the information received from each of the setting unit 11 and the evaluation unit 13. Then, the display unit 34 outputs, to the display device (not illustrated), the image data including the information indicating the attack scenario and the information indicating the index. A specific example of the image to be displayed on a screen of the display device (not illustrated) by the display unit 34 will be described later. (Operation of Data Processing Device 30)

Figure 7:
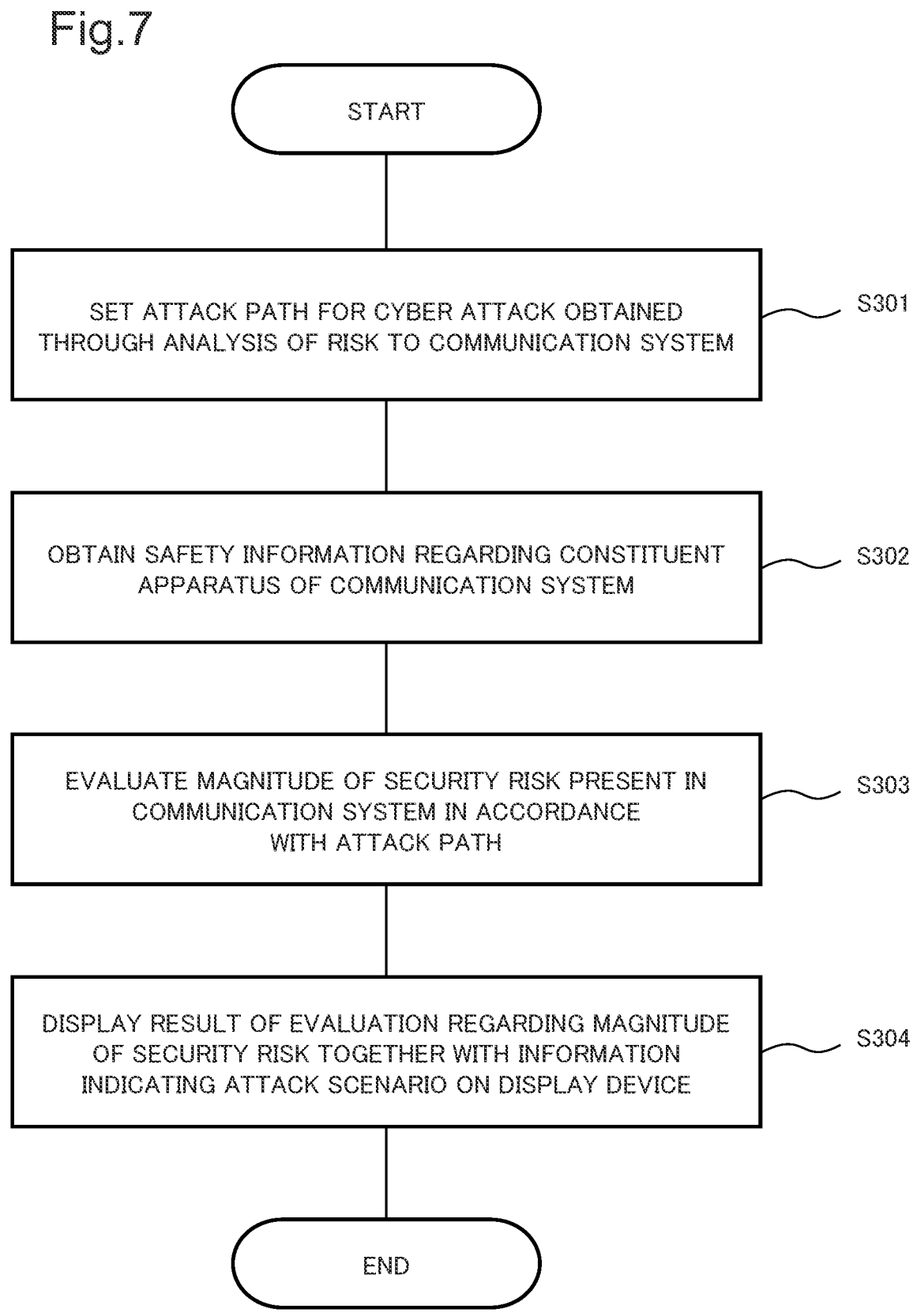
FIG. 7 is a flowchart illustrating an operation of the information communication apparatus according to the third example embodiment.

Operation of the data processing device 30 according to the present third example embodiment will be described with reference to FIG. 7. FIG. 7 is a flowchart illustrating a flow of a process to be executed by the units of the data processing device 30.

As illustrated in FIG. 7, first, the setting unit 11 sets the attack path or the attack scenario for the cyber attack obtained through analysis of the risk to the communication system 1 (FIG. 1) (S301). The setting unit 11 outputs information indicating the attack path or the attack scenario of the cyber attack to each of the evaluation unit 13 and the display unit 34.

Next, the collection unit 12 collects safety information associated with safety in terms of information security regarding the constituent apparatuses of the communication system 1 (S302). The collection unit 12 outputs, to the evaluation unit 13, the safety information associated with the safety in terms of information security regarding the constituent apparatuses of the communication system 1.

The evaluation unit 13 receives the information indicating the attack path or the attack scenario of the cyber attack from the setting unit 11. The evaluation unit 13 further receives, from the collection unit 12, the safety information associated with the safety in terms of information security regarding the constituent apparatuses of the communication system 1.

Thereafter, the evaluation unit 13 evaluates, based on the safety information, the magnitude of the security risk present in the communication system 1 in accordance with the attack path or the attack scenario. At this time, in a case where an inspection for information security is performed on the constituent apparatus related to the attack path or the attack scenario, the evaluation unit 13 evaluates the security risk to be lower than that in a case where the inspection for information security is not performed on the constituent apparatus related to the attack path (S303).

The evaluation unit 13 may save, in the third database (not illustrated), the result of the evaluation regarding the magnitude of the security risk in association with the safety information.

The evaluation unit 13 outputs, to the display unit 34, the information indicating a "risk value" (FIG. 5), which is an exemplary index representing the magnitude of the security risk present in the communication system 1.

The display unit 34 receives the information indicating the attack path or the attack scenario of the cyber attack from the setting unit 11. The display unit 34 further receives, from the evaluation unit 13, information indicating a "risk value" (FIG. 5), which is an exemplary index representing magnitude of a security risk of a communication system 1.

The display unit 34 causes the display device to display the index representing the magnitude of the security risk together with the information indicating the procedure of the attack assumed in the cyber attack.

The operation of the data processing device 30 according to the present third example embodiment is terminated as described above.

(Attack Scenario and Security Risk: First Example)

FIG. 8 is a diagram illustrating an exemplary image displayed on the screen of the display device (not illustrated) by the display unit 34 according to the present third example embodiment, which is a diagram illustrating an exemplary attack scenario and an exemplary index representing magnitude of a security risk related to the attack scenario. The index representing the magnitude of the security risk is obtained from the result of the evaluation regarding the magnitude of the security risk performed by the evaluation unit 13 (FIG. 6). In the example illustrated in FIG. 8, the index representing the magnitude of the security risk is a "risk value".

As illustrated in FIG. 8, the attack scenario includes a plurality of attack steps. Each of the attack steps is identified by a constituent apparatus (FIG. 4) to be targeted by the attack and an attack means. In each of the attack steps, there are an attack target, an attack purpose, and an attack means. In the diagram illustrating the attack scenario, the direction from left to right indicates a time passage direction. A procedure shown on the left is performed earlier, and a procedure shown on the right is performed later.

Description of the attack step may be manually created, or may be automatically generated based on the attack path (FIG. 4) set by the setting unit 11. As an example of the latter case, in FIG. 4, the "OA terminal" (or firewall 400 in addition thereto) closest to the "intrusion port" is the target of the cyber attack in the first step.

As illustrated in FIG. 8, an example of the index representing the magnitude of the security risk is a "risk value". The risk value is calculated by the evaluation unit 13 based on at least one of the three indexes, namely, the threat level, the vulnerability level, and the business damage level.

In the example illustrated in FIG. 8, the threat level is specified as "1". As described in the first example embodiment described above, in a case where the inspection for information security is performed on the constituent apparatus related to the attack path or the attack scenario, the evaluation unit 13 evaluates the security risk to be lower than that in a case where the inspection for information security is not performed on the constituent apparatus related to the attack path or the attack scenario.

Therefore, in the case where the inspection for information security is performed on the constituent apparatus related to the attack path or the attack scenario, the threat level is lower than that in the opposite case. As a result, the index representing the magnitude of the security risk is also smaller.

(Attack Scenario and Security Risk; Second Example)

FIG. 9 is a diagram illustrating an exemplary image displayed on the screen of the display device (not illustrated) by the display unit 34 according to the present third example embodiment, which is a diagram illustrating an exemplary attack scenario and an exemplary index representing magnitude of a security risk related to the attack scenario.

In the example illustrated in FIG. 9, the index representing the magnitude of the security risk is an "inspection rate". The "inspection rate" of ¾ means that the total number of the constituent apparatuses of the communication system 1 (FIG. 1) is four, and three of them have been inspected. As the inspection rate is larger, that is, closer to 1, the security risk is lower.

Unlike the risk value illustrated in FIG. 8, the inspection rate illustrated in FIG. 9 does not depend on the threat level, the vulnerability level, or the like. Therefore, the present example has an advantage that calculation of the index representing the magnitude of the security risk is simple.

(Attack Scenario and Security Risk; Third Example)

FIG. 10 is a diagram illustrating an exemplary image displayed on the screen of the display device (not illustrated) by the display unit 34 according to the present third example embodiment, which is a diagram illustrating an exemplary attack scenario and an exemplary index representing magnitude of a security risk related to the attack scenario.

In the example illustrated in FIG. 10, the indexes representing the magnitude of the security risk are both a "risk value" and an "inspection rate". In other words, the index illustrated in FIG. 10 is a combination of the first evaluation index illustrated in FIG. 8 and the second evaluation index illustrated in FIG. 9.

Also in the example illustrated in FIG. 10, the threat level is specified as "1". As described in the first example embodiment described above, in a case where the inspection for information security is performed on the constituent apparatus related to the attack path or the attack scenario, the evaluation unit 13 evaluates the security risk to be lower than that in a case where the inspection for information security is not performed on the constituent apparatus related to the attack path or the attack scenario.

In the case where the inspection for information security is performed on the constituent apparatus related to the attack path or the attack scenario, the threat level is lower than that in the opposite case. As a result, the index representing the magnitude of the security risk is also smaller.

The index representing the magnitude of the security risk is not limited to the first evaluation index, that is, the "risk value", and the second evaluation index, that is, the "inspection rate" in the three examples described above. The display unit 34 may cause the display device to display an index other than the index representing the magnitude of the security risk as a result of the evaluation regarding the magnitude of the security risk.

Effects of Present Example Embodiment

According to the configuration of the present example embodiment, the setting unit 11 sets the path or procedure for the cyber attack obtained through the analysis of the risk to the communication system 1. The collection unit 12 collects the safety information associated with the safety in terms of information security regarding the constituent apparatuses of the communication system 1. The evaluation unit 13 evaluates, based on the safety information, the magnitude of the security risk present in the communication system 1 in accordance with the path or procedure for the cyber attack, and in a case where the inspection for information security is performed on the constituent apparatus related to the path or procedure for the cyber attack, evaluates the security risk to be lower than that in a case where the inspection for information security is not performed on the constituent apparatus related to the path or procedure for the cyber attack.

With the inspection for information security being performed on the constituent apparatus of the communication system 1, the threat is considered to be smaller than that in the case where the inspection for information security is not performed, and thus the security risk related to the communication system 1 is also evaluated to be lower. The data processing device 30 determines the magnitude of the security risk in consideration of whether the inspection for information security is performed on the constituent apparatus related to the path or procedure for the cyber attack. As a result, it becomes possible to appropriately evaluate the potential security risk in the communication system 1.

Moreover, according to the configuration of the present example embodiment, the display unit 34 causes the display device to display the result of the evaluation regarding the magnitude of the security risk together with the information indicating the procedure of the attack assumed in the cyber attack. As a result, a user or an administrator is enabled to recognize the magnitude of the security risk present in the communication system 1, whereby a proper response may be made at proper timing.

(Hardware Configuration)

Figure 11:
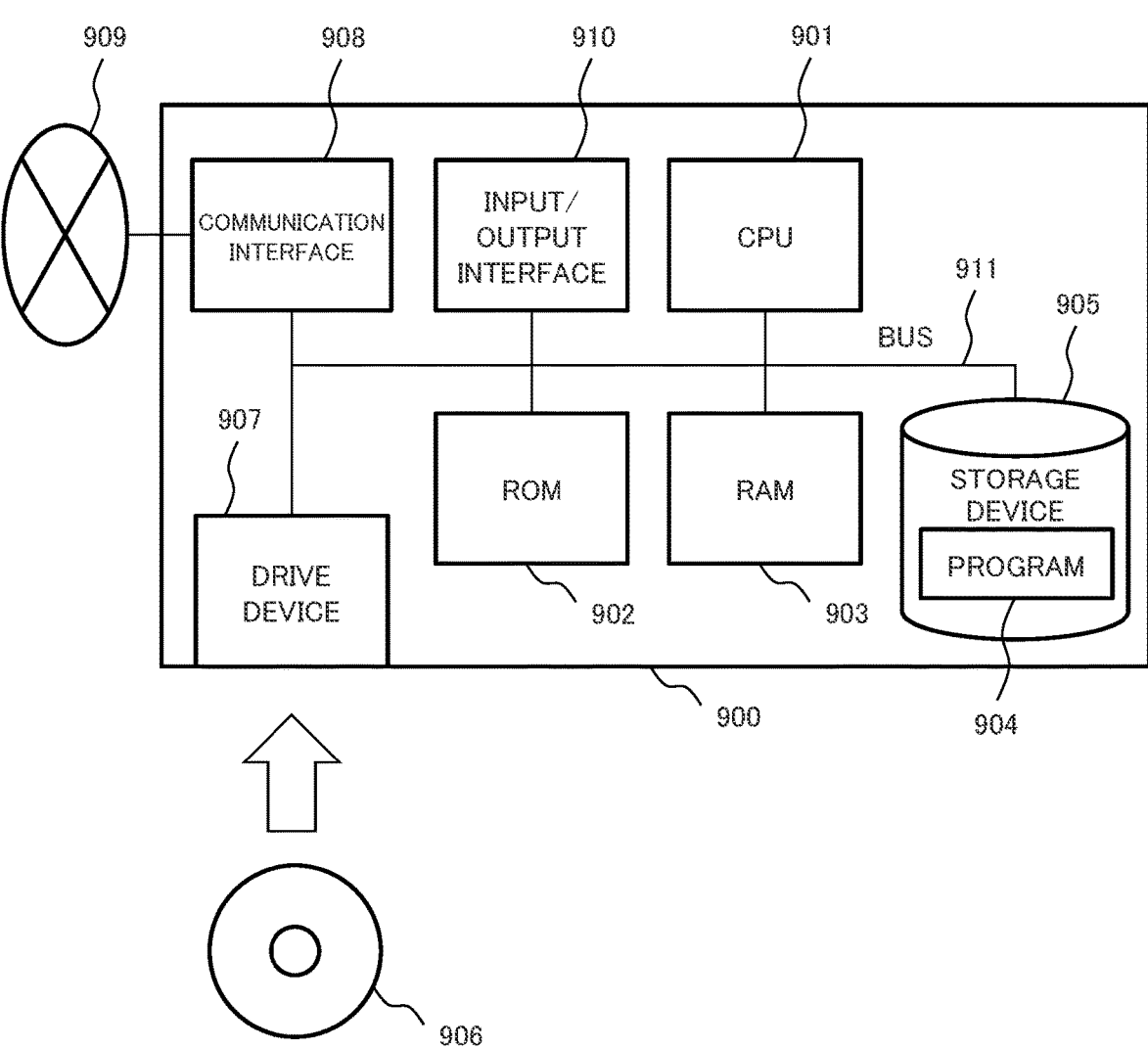
FIG. 11 is a diagram illustrating an exemplary hardware configuration of the data processing device according to any one of the first to third example embodiments.

Each component of the data processing devices 10, 20, and 30 described in the first to third example embodiments described above indicates a block in a functional unit. Some or all of those components are implemented by, for example, an information processing apparatus 900 as illustrated in FIG. 11. FIG. 11 is a block diagram illustrating an exemplary hardware configuration of the information processing apparatus 900.

As illustrated in FIG. 11, the information processing apparatus 900 includes the following components.

Central processing unit (CPU) 901
Read only memory (ROM) 902
Random access memory (RAM) 903
Program 904 to be loaded into the RAM 903
Storage device 905 that stores the program 904
Drive device 907 that performs reading/writing on a recording medium 906
Communication interface 908 that connects to a communication network 909
Input/output interface 910 that inputs/outputs data
Bus 911 that connects components The components of the data processing devices 10, 20, and 30 described in the first to third example embodiments described above are implemented by the CPU 901 reading and executing the program 904 for implementing those functions. The program 904 for implementing the functions of the components is stored in, for example, the storage device 905 or the ROM 902 in advance, and is loaded by the CPU 901 into the RAM 903 to be executed as needed. The program 904 may be supplied to the CPU 901 via the communication network 909, or may be stored in the recording medium 906 in advance so that the drive device 907 reads the program to supply it to the CPU 901.

According to the configuration described above, the data processing devices 10, 20, and 30 described in the first to third example embodiments described above are implemented as hardware. Therefore, it becomes possible to exert effects similar to the effects described in any one of the first to third example embodiments described above.

Supplementary Note

While an aspect of the present invention may also be described as the following supplementary notes, it is not limited thereto.

Supplementary Note 1

A data processing device including:
a setting means that sets a path or a procedure for a cyber attack obtained through analysis of a risk to a communication system;
a collection means that collects safety information associated with safety in terms of information security regarding a constituent apparatus of the communication system; and

an evaluation means that evaluates, based on the safety information, magnitude of a security risk present in the communication system in accordance with the path or the procedure, in which in a case where an inspection for the information security is performed on the constituent apparatus related to the path or the procedure, the evaluation means evaluates the security risk to be lower than the security risk in a case where the inspection for the information security is not performed on the constituent apparatus related to the path or the procedure.

Supplementary Note 2

The data processing device according to Supplementary Note 1, further including:

a display means that causes a display device to display a result of the evaluation indicating the magnitude of the security risk together with information indicating the procedure assumed in the cyber attack.

Supplementary Note 3

The data processing device according to Supplementary Note 1 or 2, in which the evaluation means is configured to:

calculate a first evaluation index representing the magnitude of the security risk based on a threat level indicating a likelihood of occurrence of a threat to the communication system and a vulnerability level indicating a likelihood of acceptance of the threat that has occurred by the communication system.

Supplementary Note 4

The data processing device according to Supplementary Note 1 or 2, in which the evaluation means is configured to:

calculate a second evaluation index representing the magnitude of the security risk based on a ratio of the number of the constituent apparatuses on the path on which the inspection for the information security has been performed to the number of the constituent apparatuses on the path.

Supplementary Note 5

The data processing device according to any one of Supplementary Notes 1 to 4, in which the evaluation means is configured to change a result of the evaluation depending on a type of the performed inspection for the information security.

Supplementary Note 6

The data processing device according to any one of Supplementary Notes 1 to 4, in which the evaluation means is configured to change a result of the evaluation depending on origin of the constituent apparatus on which the inspection for the information security has been performed.

Supplementary Note 7

A data processing method including:

setting a path or a procedure for a cyber attack obtained through analysis of a risk to a communication system;

collecting safety information associated with safety in terms of information security regarding a constituent apparatus of the communication system;

evaluating, based on the safety information, magnitude of a security risk present in the communication system in accordance with the path or the procedure; and in a case where the inspection for the information security is performed on the constituent apparatus related to the path or the procedure, evaluating the security risk to be lower than the security risk in a case where the inspection for the information security is not performed on the constituent apparatus related to the path or the procedure.

Supplementary Note 8

The data processing method according to Supplementary Note 7, further including:

causing a display device to display a result of the evaluation indicating the magnitude of the security risk together with information indicating the procedure assumed in the cyber attack.

Supplementary Note 9

The data processing method according to Supplementary Note 7, further including:

calculating a second evaluation index representing the magnitude of the security risk based on a ratio of the number of the constituent apparatuses on the path on which the inspection for the information security has been performed to the number of the constituent apparatuses on the path.

Supplementary Note 10

A non-transitory recording medium storing a program for causing a computer to perform:

setting a path or a procedure for a cyber attack obtained through analysis of a risk to a communication system;

collecting safety information associated with safety in terms of information security regarding a constituent apparatus of the communication system;

evaluating, based on the safety information, magnitude of a security risk present in the communication system in accordance with the path or the procedure; and in a case where an inspection for the information security is performed on the constituent apparatus related to the path or the procedure, evaluating the security risk to be lower than the security risk in a case where the inspection for the information security is not performed on the constituent apparatus related to the path or the procedure, in which in the case where the inspection for the information security is performed on the constituent apparatus that performs the path or the procedure, the evaluating includes evaluating the security risk to be lower than the security risk in the case where the inspection for the information security is not performed on the constituent apparatus related to the path or the procedure.

Supplementary Note 11

The recording medium according to Supplementary Note 10, storing the program for causing the computer to further perform:

causing a display device to display a result of the evaluation indicating the magnitude of the security risk together with information indicating the procedure assumed in the cyber attack.

Supplementary Note 12

The recording medium according to Supplementary Note 10, storing the program for causing the computer to further perform:

changing a result of the evaluation depending on origin of the constituent apparatus on which the inspection for the information security has been performed.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention may be used for an inspection for information security of a communication system, for example, vulnerability diagnostics of an information communication apparatus included in the communication system, and evaluation of a security risk of the communication system.

REFERENCE SIGNS LIST 1 communication system
10 data processing device
11 setting unit
12 collection unit
13 evaluation unit
20 data processing device
30 data processing device
34 display unit
100 node (control server)
200 node (client terminal)
300 switch
400 firewall

What is claimed is:

1. A data processing device comprising:
a memory configured to store instructions; and
at least one processor configured to execute the instructions to:
   set a path or a procedure for a cyber attack obtained through analysis of a risk to a communication system;
   collect safety information associated with safety in terms of information security regarding a constituent apparatus of the communication system;
   evaluate, based on the safety information, a magnitude of a security risk present in the communication system in accordance with the path or the procedure, wherein the safety information includes information indicating whether an inspection for the information security is performed on the constituent apparatus;
   in a case where the inspection for the information security is performed on the constituent apparatus related to the path or the procedure, evaluate the security risk to be lower than the security risk in a case where the inspection for the information security is not performed on the constituent apparatus related to the path or the procedure; and
   calculate a second evaluation index representing the magnitude of the security risk based on a ratio of a number of constituent apparatuses of the communication system on the path on which the inspection for the information security has been performed to a number of the constituent apparatuses on the path.

2. The data processing device according to claim 1, wherein
the at least one processor is further configured to execute the instructions to:
   cause a display device to display a result of the evaluation indicating the magnitude of the security risk together with information indicating the procedure assumed in the cyber attack.

3. The data processing device according to claim 1, wherein
the at least one processor is further configured to execute the instructions to:
   calculate a first evaluation index representing the magnitude of the security risk based on a threat level indicating a likelihood of occurrence of a threat to the communication system and a vulnerability level indicating a likelihood of acceptance of the threat that has occurred by the communication system.

4. The data processing device according to claim 1, wherein
the at least one processor is further configured to execute the instructions to:
   change a result of the evaluation depending on a type of the performed inspection for the information security.

5. The data processing device according to claim 1, wherein
the at least one processor is further configured to execute the instructions to:
   change a result of the evaluation depending on origin of the constituent apparatus on which the inspection for the information security has been performed.

6. A data processing method comprising:
setting a path or a procedure for a cyber attack obtained through analysis of a risk to a communication system;
collecting safety information associated with safety in terms of information security regarding a constituent apparatus of the communication system, the safety information including information indicating whether an inspection for the information security is performed on the constituent apparatus;
evaluating, based on the safety information, a magnitude of a security risk present in the communication system in accordance with the path or the procedure;
in a case where the inspection for the information security is performed on the constituent apparatus related to the path or the procedure, evaluating the security risk to be lower than the security risk in a case where the inspection for the information security is not performed on the constituent apparatus related to the path or the procedure; and
calculating a second evaluation index representing the magnitude of the security risk based on a ratio of a number of constituent apparatuses of the communication system on the path on which the inspection for the information security has been performed to a number of the constituent apparatuses on the path.

7. The data processing method according to claim 6, further comprising:

causing a display device to display a result of the evaluation indicating the magnitude of the security risk together with information indicating the procedure assumed in the cyber attack.

8. A non-transitory recording medium storing a program configured to cause a computer to perform:

setting a path or a procedure for a cyber attack obtained through analysis of a risk to a communication system;

collecting safety information associated with safety in terms of information security regarding a constituent apparatus of the communication system, the safety information including information indicating whether an inspection for the information security is performed on the constituent apparatus;

evaluating, based on the safety information, a magnitude of a security risk present in the communication system in accordance with the path or the procedure;

in a case where the inspection for the information security is performed on the constituent apparatus related to the path or the procedure, evaluating the security risk to be lower than the security risk in a case where the inspection for the information security is not performed on the constituent apparatus related to the path or the procedure; and calculating a second evaluation index representing the magnitude of the security risk based on a ratio of a number of constituent apparatuses of the communication system on the path on which the inspection for the information security has been performed to a number of the constituent apparatuses on the path.

9. The non-transitory recording medium according to claim 8, wherein the program is further configured to cause the computer to perform:

causing a display device to display a result of the evaluation indicating the magnitude of the security risk together with information indicating the procedure assumed in the cyber attack.

10. The non-transitory recording medium according to claim 8, wherein the program is further configured to cause the computer to perform:

changing a result of the evaluation depending on origin of the constituent apparatus on which the inspection for the information security has been performed.

\* \* \* \* \*